United States Patent Office 3,218,066
Patented Nov. 16, 1965

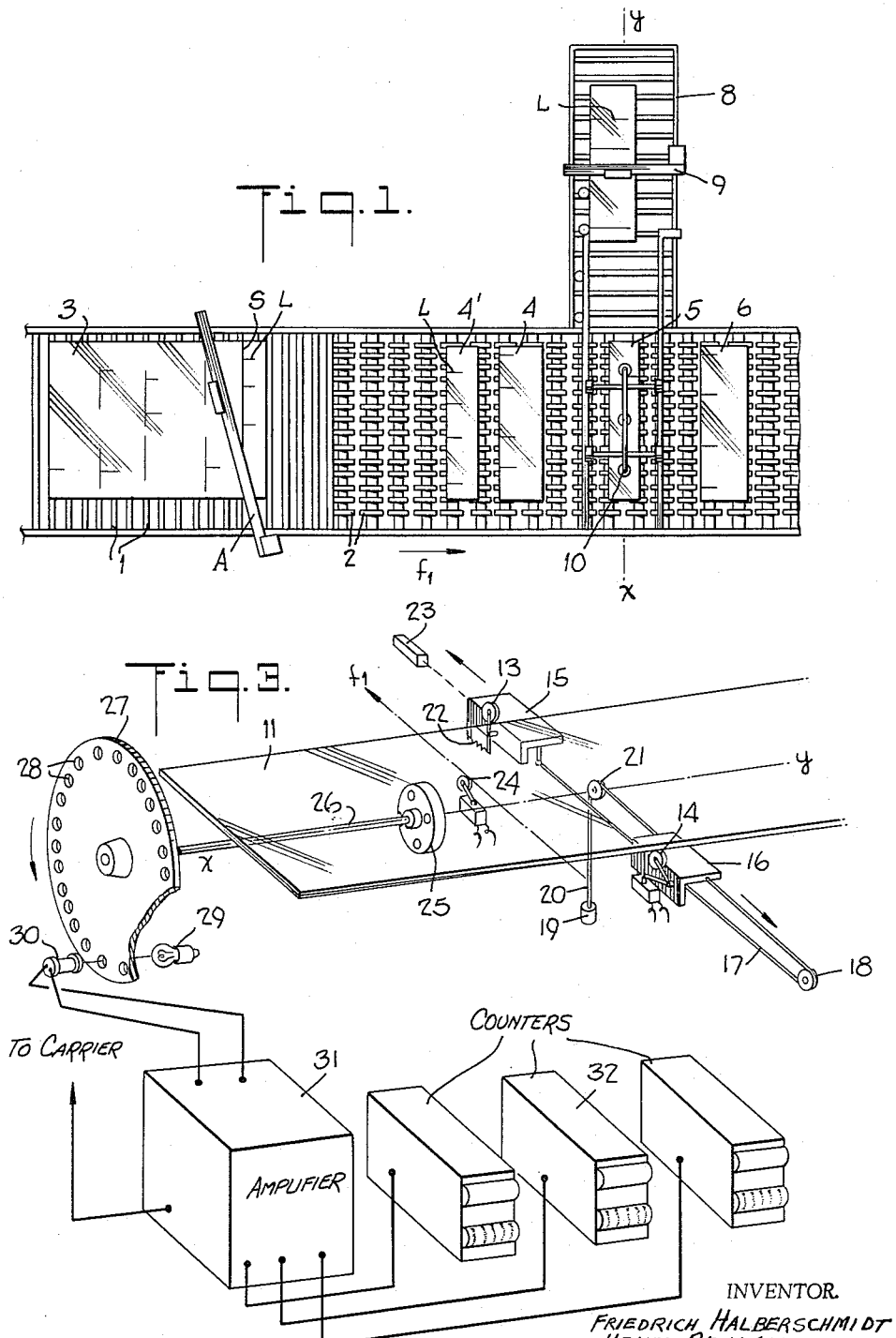

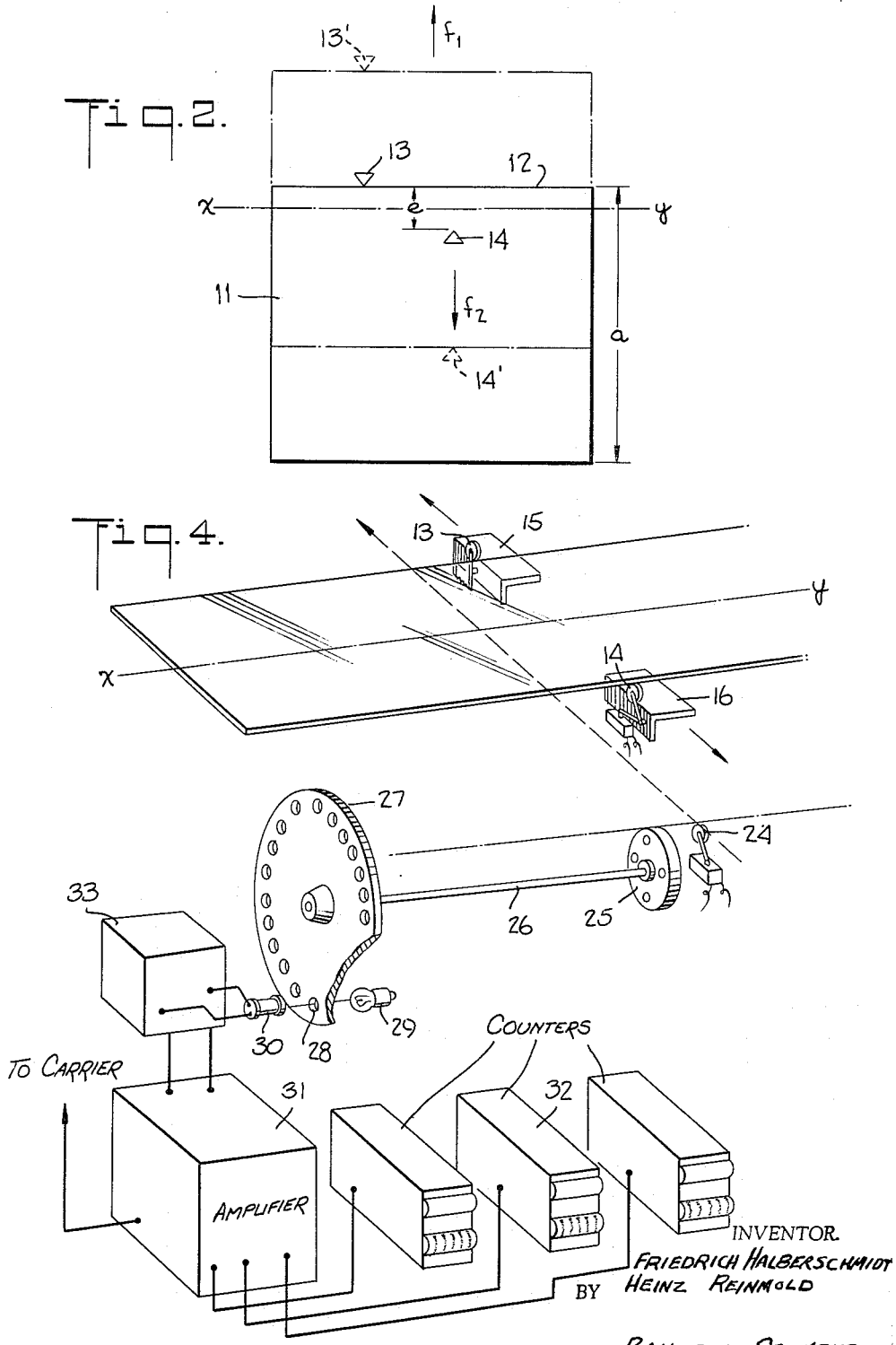

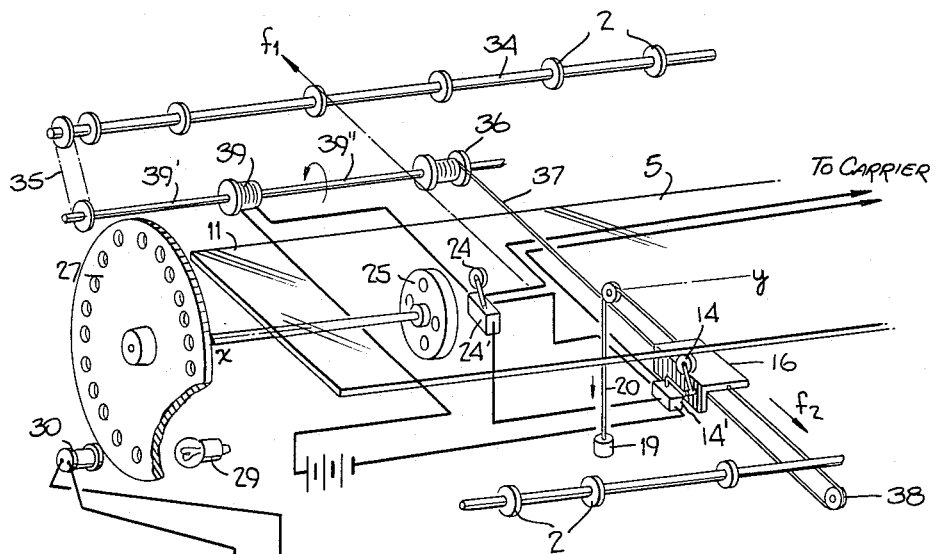

3,218,066
PROCESS AND APPARATUS FOR
HANDLING SHEETS
Friedrich Halberschmidt and Heinz Reinmold, Merkstein,
Germany, assignors to Compagnie de St. Gobain, Neu-
illy-sur-Seine, France
Filed May 16, 1963, Ser. No. 280,827
Claims priority, application France, May 22, 1962,
898,330
13 Claims. (Cl. 271—57)

This invention relates to a method and apparatus for handling sheets of relatively rigid material. As the invention is particularly adapted to the handling of glass, it will be set forth in connection with that use. It is to be understood, however, that it is equally applicable, at least in some of its forms, to the manipulation of sheets of other material.

The cutting of sheet glass into marketable sizes and its handling during cutting is a matter of some difficulty requiring precise co-ordination of several types of machinery. The glass sheet itself as it comes to the cutting table is frequently imperfect in spots. In order to eliminate the areas of imperfection and to secure the largest marketable sizes, it is customary to inspect the sheet to discover the flaws, to mark out upon it the lines which are to be followed in cutting, to cut it along the marked lines. These lines are usually straight and parallel to the edges of the sheet. In accordance with the invention set forth in the earlier case a machine was provided in which the large sheet of glass which was to be cut was laid and transported on rollers along a bed, being cut transversely as it moved along the bed on driven supporting rollers. The pieces thus cut from the large sheet were then carried to a lifting station in which lifting apparatus took the pieces off the bed and moved them on to a second bed disposed at right angles to the first bed. The conveyor which lifted the glass from the first bed deposited it on the second from whence transporting rollers carried it to another cutting station at which it was reduced to its final sizes. Apparatus of this sort is shown in FIG. 1 and a reference to it is necessary for a proper understanding of the present invention.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views,
FIG. 1 is a plane view of a glass cutting table;
FIG. 2 is a diagram illustrating the mathematical principles of the present invention;
FIG. 3 is a diagrammatic view in perspective of an apparatus according to the present invention;
FIG. 4 illustrates a modification of the invention of FIG. 3;
FIG. 5 is a perspective diagram of a preferred form of the invention.

Referring to FIG. 1 the cutting table is provided with a bed composed of supporting rollers 1, which are mounted in a frame not numbered; the supporting rollers 1 are driven at constant speed and pass beneath a cutter A the angularity of which, combined with the speed of the scoring element, provides a component of motion parallel and equal to the speed of the sheet. This cutter thus produces straight line cuts perpendicular to the longitudinal edges of the glass 3, as indicated by lines S. Longitudinal marks L indicate the places at which cuts will be made perpendicularly to S. After the first cutting has been completed, the rollers 1 move the severed section on to wheels 2 which are driven at a uniform but somewhat faster speed than rollers 1 so as to achieve a separation of the sections as indicated between 4 and 4'. When a section reaches the center line or axis $xy$ of the lateral table 8, where further cutting is to take place, a conveyor 10, frequently of vacuum type, picks up the section, in this instance 5, and moves it on to the table 8. A cutter 9 is provided on the table 8 for use in reducing the sheet to its final sizes by cutting along the lines L.

In practice it has been difficult to align the sheet sections on the axis $xy$, and this has led to some difficulty in handling the sheet on table 8. In some cases the carrier 10 would deposit the sheet on table 8 to the left of the line $xy$ and sometimes to the right of it.

It is an object of this invention to arrange the carrier 10 and the sheet 5 so that the carrier will pick up the sheet when the axis of the sheet substantially coincides with the axis $xy$ and with the axis of the carrier 10. There was no practical method to do this manually, by rule and line. It was in the study of this problem that the present invention was made, some of the principles of which are broader than the specific problem.

The object of this apparatus is to activate the carrier 10 to pick up the glass and move it on to the table 8 as soon as the center line of the plate coincides with the vertical plane through the axis $xy$ of FIG. 1. In order to achieve this, a switch 24' is provided with a contact roller 24 which is to engage the bottom of the glass as it is moved by rollers 2 toward the axis and is mounted on the upper end of a spring-biased arm which is biased toward the upright position. When the glass 5, moving in the direction of the arrow $f_1$, engages the roller 24 it depresses it and current flows to an electromagnetic clutch 39 which connects the two sections 39' and 39" of a shaft which is driven at one end through chain 35 from a shaft 34 which carries supporting rollers 2. Section 39" of the shaft carries a reel 36 to which is attached a cable 37 which passes around a pulley 38 and is attached to the end of a carriage 16. The carriage is mounted on a rail which is not shown. A counter-weight 19 is connected by a cable 20 to the opposite end of carriage 16. When the shaft 39" is driven through the clutch 39, the reel 36 winds up the cable and pulls the carriage toward the pulley 38. When the clutch 39 is not engaged, the counter-weight 19 pulls the carriage 16 back to a position in which the contact roller 14 is aligned with the contact roller 24 on the axis $xy$. The contact 14 is mounted on a spring-biased arm, the tendency of which is to raise the arm to upright position. The arm is attached to a switch 14' which is also connected to the clutch 39. When both contacts 24 and 14 are depressed by the sheet 5, the current flows to and activates the clutch 39 to drive the reel 36 but when the switch 14 is in erect position, not depressed by the sheet, the activating current is cut off from the clutch, which disengages and stops the reel 36. The shaft 39' winds up the line 37 as the carriage 16 returns the contact 14 to alignment with the axis $xy$.

In the particular operation which is shown in FIG. 5 the contacts 24 and 14 being side by side in alignment with the axis $xy$, the sheet 5 approaches along the table toward the axis $xy$, and its leading edge simultaneously engages the contacts 24 and 14, depressing them and activating the clutch 39. The reel 36 moves the carriage 16 in the direction of the arrow $f_2$ at the same speed as sheet 5 but in the opposite direction. When the contact 14 leaves the sheet 1, the center line of the sheet will be precisely aligned with the axis $xy$ and with the axis of the carrier 10. A second set of switches 14', 24' are connected to the operating mechanism for the carrier which is not shown. When both switch contacts 24 and 14 are depressed, the carrier is not operating; when both are in raised position, the carrier is not operating; but when switch contact 24 is depressed and switch contact 14 is raised, a condition which occurs as the contact leaves the sheet, the carrier is operated to pick up the sheet and move it on to the lateral table bed. In this way the carrier operates upon a sheet of glass which is correctly balanced, and lays it flat upon the center line of the transverse table.

It will be seen from this description that the invention includes a novel system of locating a center line by the opposite motion of elements, in the foregoing case the opposite motion of the piece of glass and the carriage 16.

The same principle can be used to locate any point on a sheet at a selected proportion of the distance between its leading and its following edges. The object is moved in one direction at a constant speed and a spanning device travels from the leading to the following edge at a rate which is proportioned to the speed of the sheet. If the spanning device travels at the same speed as the sheet, it will produce an alignment between the center of the sheet and some fixed point. If the spanning device moves faster than the sheet, which can be arranged very easily by enlarging the diameter of the reel in FIG. 5, the spanning device will align a part of the sheet which is in advance of the center with the fixed point. If the reel is made smaller, the sheet will travel faster than the spanning device and a part of the sheet aft of the center will be aligned with the fixed point. The part of the sheet which is to be aligned with the fixed point can be selected with great accuracy as its location will be proportional to the speeds of the sheet and the spanning device. It is apparent, consequently, that this invention involves a method of division based upon the relative speeds of two moving objects and not upon mensuration in any ordinary sense.

In industry the cutting of the glass sheet to commercial dimensions is done by cutting larger sheets while taking note of defects. As a result, there is produced a succession of smaller sheets of different dimensions, which are transported after the first cutting so that one of the sides is substantially perpendicular to the axis of the carrier. The carrier takes these sheets to locations where they may be worked on, and when they arrive at these locations they may be worked on at that place or shifted to other supporting means for further attention.

It is important to be able to operate automatically so that the transfer of the sheets from one conveyor to another shall be centered on the axis of the second conveyor, that is to say when the central axis of the section is aligned with the fixed axis of the lateral conveyor. In order to explain this we will assume a first conveyor on which the large sheet is cut into sections and a second conveyor to which each section is removed, in sequence, and upon which it is cut into the pieces which are to be sold.

It has been attempted to use abutments or fixed contacts which are activated by the leading edge of the section but they do not give satisfaction because the sections are not of the same fore and aft dimensions.

The novel process of the invention provides that the arrival of the leading edge of the section of the glass at a position chosen will initate the departure of a spanning device which moves at the same speed but in the opposite direction along the section. This spanning device takes its departure from a position symmetrical with respect to the chosen position, in the drawings the axis $xy$. It is provided that when the spanning device leaves the after edge of the glass section it closes the contact which starts the transfer device, which picks up the piece of glass and moves it on to the lateral table.

It is an object of the invention to produce the alignment of any selected part of a moving body, particularly of a flat sheet, with a fixed point by means which do not involve process of ordinary mensuration.

Another object is to improve the handling of glass in cutting operations.

Yet another object is to improve the machinery for handling sheets and for transferring the sheets from one carrier to another.

The objects of the invention as to process are accomplished generally speaking by a method of bringing a selected internal part of a sheet to a point, and of acting on the sheet when the part coincides with the point, which comprises moving the point and the sheet relatively toward each other until the leading edge of the sheet reaches the point, putting a movable contact into engagement with the sheet near the point, moving the sheet and moving the contact oppositely to the sheet at speeds proportioned to the distance from the selected part to the leading and following edges of the sheet, and initiating the action of means capable of acting on the sheet when the moving contact reaches the following edge of the sheet. The objects as to apparatus are accomplished generally speaking by apparatus for locating a part of a sheet, at a selected proportion of the distance between its leading and its following edge, in alignment with a point, which comprises means to move the sheet at a selected speed along a predetermined path which includes the point, movable sheet spanning means, means to move the spanning means from the leading to the after ends of the sheet at a speed proportioned to the speed of the sheet, means to start the spanning means when the point is adjacent the leading edge of the sheet, and means to activate operating means when the spanning means is adjacent the after end of the sheet.

Referring now to FIG. 1 the large sheet 3, properly marked for cutting, is transported on the rollers 1 and the driving wheels W to be cut into selected lengths by the cutter A; the lengths are of uneven size, being chosen so as to produce the most economical sizes of marketable glass. There may be a number of laterally extending tables 8 extending from the main table and various sections such as 5 may be directed to the first of these while other sections such as 6 may be allowed to pass for treatment at other locations.

Another important method of carrying out the invention and an apparatus differing from the apparatus of FIG. 5 is shown in FIG. 3. The section of glass 11 moves in the direction of the arrow $f_1$ on supporting wheels which are not shown. Below the plane of the section are located two carriages 15 and 16 which, in their position of rest, abut one another with their meeting ends aligned with the axis $xy$. These carriages are connected by a cable 17 which goes over a pulley 18 so that when the carriage 15 is moved by the advancing edge of the glass, the carriage 16 will be moved in the opposite direction. A fixed abutment 23 is aligned with the carriage 15 so as to put a positive limit on its motion. A counter-weight 19 is connected through a cable 20, which passes over pulley 21, to the carriage 16, and serves to return the carriages to abutting position when the carriage 15 has been released by the glass. An abutment 13 is pivoted on the side of carriage 15 and is biased toward the glass by a spring 22, which is of sufficient strength to keep the abutment in upright position until the carriage 15 strikes the abutment 23. The carriage 16 has a spring-biased spanning member 14 which operates a switch. The spanning member is connected to the switch, which is operated when the member is depressed by the glass. The spanning members 13 and 14 are equidistant from the axis xy when the carriages 15 and 16 are in abutting position. The apparatus also includes a contactor 24 which operates another switch when it is depressed by the glass.

The apparatus of FIG. 3 operates as follows:

The carriages 15 and 16 being in abutting position, the sheet of glass first engages the roller 14, depressing it so that it will run along the underside of the glass and span it from edge to edge; the glass then engages the roller 24, which is located on the axis xy, and depresses it so that it runs along the undersurface of the glass. Rollers 14 and 24 are connected to switches which are operated when the glass engages the rollers. The edge of the glass then engages the pivoting abutment 13 and moves the carriage 15 which, through cable 17, pulls carriage 16 in the opposite direction. When the after edge of the glass sheet leaves the rollers 14, the switch is opened and whatever operation is controlled by the switch occurs. The sheet continues to move the carriage 15 until it strikes the abutment 23, whereupon the sheet depresses the abutment 13 and the weight 19 returns both carriages to abutting position.

The contact 14 provides an electrical signal which is used to control the carrier 10, which is aligned with the axis xy. Such carriers operate pneumatically and need not be described in detail, being known. The contact 24 operates a switch which electrically activates an apparatus for sorting the glass sheets. A sorting mechanism is illustrated in which a wheel 25 engages the underside of the sheet, a shaft 26 is driven by the wheel parallel to the axis xy and in the vertical plane of the axis; the wheel 25 is driven by the glass sheet substantially without loss of motion. Supported on the outer end of the shaft 26 is a wheel 27 which can be driven directly or through reduction gears. In this wheel are openings 28 which are equally spaced and which are circularly arranged so that they pass between a light 29 and a photoelectric cell 30. The light which passes through these holes generates in the cell a series of impulses which are transmitted to an amplifier 31 and one or more impulse counters 32. When the wheels 25 and 24 are engaged by the leading edge of the glass sheet, the impulse counters are activated. These counters are set to emit electrical impulses when a certain number of impulses have been received, for instance 10. These impulses consequently establish a standard of length and determine whether the glass sheet is of the length required at the first lateral table 8. For instance, the apparatus may be set so that sheets less than 10 impulses long will be picked up by the conveyor 10 and moved on to the table 8 while sheets longer than 10 impulses will be allowed to proceed along the main table, as illustrated in FIG. 1. To take into consideration certain tolerances, the signal emitted by the counters 32 may have a certain departure from theory; for instance, if one wishes to move glass sheets 70 cm. long on to table 8, one may accept a dispersion of plus or minus ½ cm. so that the proper signal will be emitted in the range from 69.5 cm. to 70.5 cm.

By combining the signal of contact switch 14 and counter 32, the control signal emitted by counter 32 will pass only when a sheet of glass of the selected length is centered on axis xy. The signal from 14 and the signal from 32 pass to relays which are in the electrical line which activates the conveyor 10. If one or the other of these signals from switch 14 and counter 32 is not operating, the conveyor will not operate and the glass will pursue its way along the main table as indicated in FIG. 1.

In that which has gone before, the shaft 26 has been assumed to be in the vertical plane of the axis xy, and so also the point of contact of wheel 24 with the glass. This arrangement is advantageous but not indispensable. The measurement of the sheet of glass may be carried out apart from and in advance of the aligning mechanism. Under such circumstances, the two signals from contact 14 and counter 32 will not occur simultaneously but they may be co-related by preselective apparatus or by electrical memories to activate or inactivate the conveyor in accordance with the length of the section. Such an apparatus is represented in FIG. 4 wherein the apparatus 24, 25, 26, 27, 29, and 30 is in advance of the aligning apparatus, the cell 30 being connected to the amplifier 31 and counter 32 through an electronic memory 33.

The principles of the invention are set forth mathematically in FIG. 2, as applied to the type of apparatus of FIG. 3. The sheet of glass 11 moves in the direction $f_1$. When its leading edge 12 reaches the abutment 13, it engages that abutment and moves it toward the dotted-line position 13'. Simultaneously the spanning mechanism 14, which is as far behind the axis xy as the abutment 13 is ahead of it, is moved in the direction $f_2$ toward the dot-dash line position 14'. The speeds of abutment 13 and contact 14 are equal. If $e$ is the distance between 13 and 14, measured in the direction of motion of the sheet, and if $a$ is the length of the sheet, the contact 14 will leave the sheet when the relation $$\frac{a-e}{2}$$

is established. The glass will then occupy the position indicated in dot-dash lines and its leading edge 12' will be at a distance $$\frac{a-e}{2}+\frac{e}{2}=\frac{a}{2}$$

from the axis xy, which is to say that its transverse axis will be aligned with the axis xy. In practice the center of the sheet will be centered under the operative part of the conveyor 10.

The same result will be achieved whenever the abutment 13 and the contact 14 are symmetrical with respect to the axis xy, for instance side by side.

If it is desired to activate the working mechanism when some other part of the sheet than its transverse axis is beneath the axis xy, it is only necessary to provide that the contact and the sheet move at different speeds. The relation of the speeds one to the other establishes the location of the part of the sheet which is aligned with the axis xy and consequently the part of the sheet upon which the conveyor or other working mechanism are to act.

It is to be understood that the principle is applicable to any moving body and to any two points on it. In the present description the points of activation are the leading and following edges of a sheet of glass, but the principle would be equally applicable if the apparatus were to start at a point six centimeters abaft the leading edge and terminate ten centimeters before the following edge. In such cases it is convenient to apply to the glass marks, protuberances, or electrical contacts which will activate the spanning and the measuring devices.

This apparatus and this principle is also useful in the timing of operations which are not necessarily to be done upon the sheet itself, but elsewhere, the sheet and its associated spanning mechanism serving as a timing control.

This invention locates a precise point in the length of an object by moving the object and a spanning means in opposite directions at proportional speeds. The invention utilizes this novel principle for the operation of machinery at a particular time, at a particular location, for instance in a glass plate. The invention is particularly valuable in its application to the sorting and handling of glass sheets during the cutting and sizing operations and is adapted to the automatic handling of glass sheets in a mechanized factory. Another advantage of the invention is the relative simplicity of construction which arises from the new principle of operation. Another advantage is that the breakage of the sheets during handling, sorting and working is materially reduced.

As many apparently widely different embodiments of the present invention may be made without departing from the spirit and scope thereof, it is to be understood that the invention is not limited to the specific embodiments.

What is claimed is:

1. A method of bringing a selected internal part of a sheet to a point, and of acting on the sheet when the part coincides with the point, which comprises moving the point and the sheet relatively toward each other until the leading edge of the sheet reaches the point, putting a movable contact into engagement with the sheet near the point, moving the sheet and moving the contact oppositely to the sheet at speeds proportioned to the distances from the selected part to the leading and following edges of the sheet, and initiating the action of means capable of acting on the sheet when the moving contact reaches the following edge of the sheet.

2. A method of bringing the center of a flat body into coincidence with a predetermined point which comprises bringing the body and the point together, engaging a contact with the leading part of the body and moving the body and the contact in opposite directions at substantially the same speed until the contact leaves the body.

3. A method of bringing the center of a sheet into coincidence with a predetermined point and of acting upon the sheet when coincidence is established which comprises moving the sheet and the point together at selected speed, initiating the motion of a body across the sheet in the reverse direction at the speed of the sheet when the leading edge of the sheet and the point meet, and energizing means capable of acting on the sheet when the body leaves the sheet.

4. A method of bringing the center of a sheet into coincidence with a predetermined point and of acting upon the sheet when coincidence is established which comprises moving the sheet and the point together at selected speed, initiating the motion of a body with the sheet and a like motion of a second body in the opposite direction when the leading edge of the sheet coincides approximately with the point, and energizing means capable of acting on the sheet when the position of the second body approximately coincides with the after edge of the sheet.

5. A method of bringing the center of a sheet into alignment with a point, and of acting on the sheet when its center coincides with the point which comprises moving the point and the sheet relatively toward each other until the leading edge of the sheet reaches the point, moving coupled contacts in opposite directions when the leading part reaches the said point, and initiating the action of means capable of acting on the sheet when the reversely moving contact reaches the following edge of the sheet.

6. Apparatus for locating a part of a sheet, at a selected proportion of the distance between its leading and its following edge, in alignment with a point, which comprises means to move the sheet at a selected speed along a predetermined path which includes the point, movable sheet spanning means, means to move the spanning means from the leading to the after ends of the sheet at a speed proportioned to the speed of the sheet, means to start the spanning means when the point is adjacent the leading edge of the sheet, and means to activate operating means when the spanning means is adjacent the after end of the sheet.

7. Apparatus for locating a part of a sheet, at a selected proportion of the distance between its leading and its following edge, in alignment with a point, which comprises means to move the sheet at a selected speed along a predetermined path which includes the point, movable sheet spanning means, means to move the spanning means from control means associated with the transport means and the beds comprising fixed and movable spring-biased sheet contacts disposed in association with the first bed in the part of the sheet, means to move the sheet, means to move one of said sheet contacts opposite to the sheet at a speed proportional to the speed of the sheet, said means to move the movable contact including a pulley operably connected to the contact, driving means, clutch means connecting the driving means to the pulley, means to engage the clutch when the fixed contact engages the sheet and means to disengage the clutch when the movable contact leaves the sheet.

8. In apparatus for handling relatively rigid sheets which includes a first bed, means to move a sheet along the bed, a second bed angularly disposed with respect to the first bed, means to move a sheet along the second bed, and means to transport a sheet from the first to the second bed:

control means associated with the transport means and the beds comprising a first movable carriage associated with the first bed, disposed in the path of the sheet, and provided with a sheet-engaging, spring-biased abutment, a second movable carriage, carrying a spring-biased sheet contact, associated with the first bed and connected to the first carriage for like motion in the opposite direction, said carriages when at rest being disposed symmetrically with respect to the transport means, means to activate the transport means when the contact escapes from the sheet, and means to release the sheet from the abutment.

9. A method of starting an action when a chosen part of the length of an object reaches a fixed point which comprises moving the object over the fixed point, simultaneously moving a spanning means over the object from the direction of the fixed point to the after end of the moving object at a speed proportioned to the speed of the object, and starting the action when the spanning means leaves the object.

10. A method for transferring glass sheets and bands carried by a carrier from said carrier to another lateral carrier or working station when the transversal axis of the bands coincides with a predetermined axis of alignment, fo example the axis of the carrier or of the woking station, said method consisting in that the displacement of the leading edge of the band to an arbitrary chosen position acts to initiate the starting from a symmetric position with respect to said alignment axis of a carriage provided with an electrical contact and travelling at the same speed as the band but in an opposite direction in such a manner that when the contact is broken by the arrival of the carriage at the posterior edge of the band the transversal axis is placed in coincidence with the alignment axis and a signal is emitted to cause the starting of the transferring operation.

11. An apparatus for transferring glass sheets and bands carried by a carrier from said carrier to another lateral carrier or working station when the transversal axis of the bands coincides with a predetermined axis of alignment, for example the axis of the carrier or of the working station, said apparatus comprising means enabling that the displacement of the leading edge of the band to an arbitrary chosen position acts to initiate the starting from a symmetric position with respect to said alignment axis of a carriage provided with an electrical contact and travelling at the same speed as the band but in an opposite direction in such a manner that when the contact is broken by the arrival of the carriage at the posterior edge of the band, the transversal axis is placed in coincidence with the alignment axis and means to emit a signal for starting the motion of the transferring organ.

12. An apparatus according to claim 11 characterized by the combination of the means to emit the signal of the alignment apparatus with a sorting apparatus provided with signals emitting means according to at least one of the characteristics comprising lengths or weight.

13. An apparatus according to claim 11 when the bands have a determined length measured in the travelling direction in which the band operates during its travel a device producing electrical impulses, the number of impulses depending from the advance of the band, therefore of its length, said impulses being transmitted to counters emitting a signal for a determined number of impulses.

References Cited by the Examiner
UNITED STATES PATENTS

| | | | |
|---|---|---|---|
| 2,993,593 | 7/1961 | Eckstein | 209—88 |
| 3,008,578 | 11/1961 | Clough | 209—88 |
| 3,049,348 | 8/1962 | Golding | 271—60 |
| 3,080,163 | 3/1963 | Pasquinelli | 271—60 |
| 3,096,871 | 7/1963 | Anderson | 198—34 |
| 3,126,199 | 4/1964 | Rosoff | 271—12 |

M. HENSON WOOD, JR., *Primary Examiner.*

ANDREW R. JUHASZ, *Examiner.*